May 6, 1952  J. L. FISHER  2,596,019
LIQUID DAMPED GALVANOMETER
Filed Dec. 4, 1948
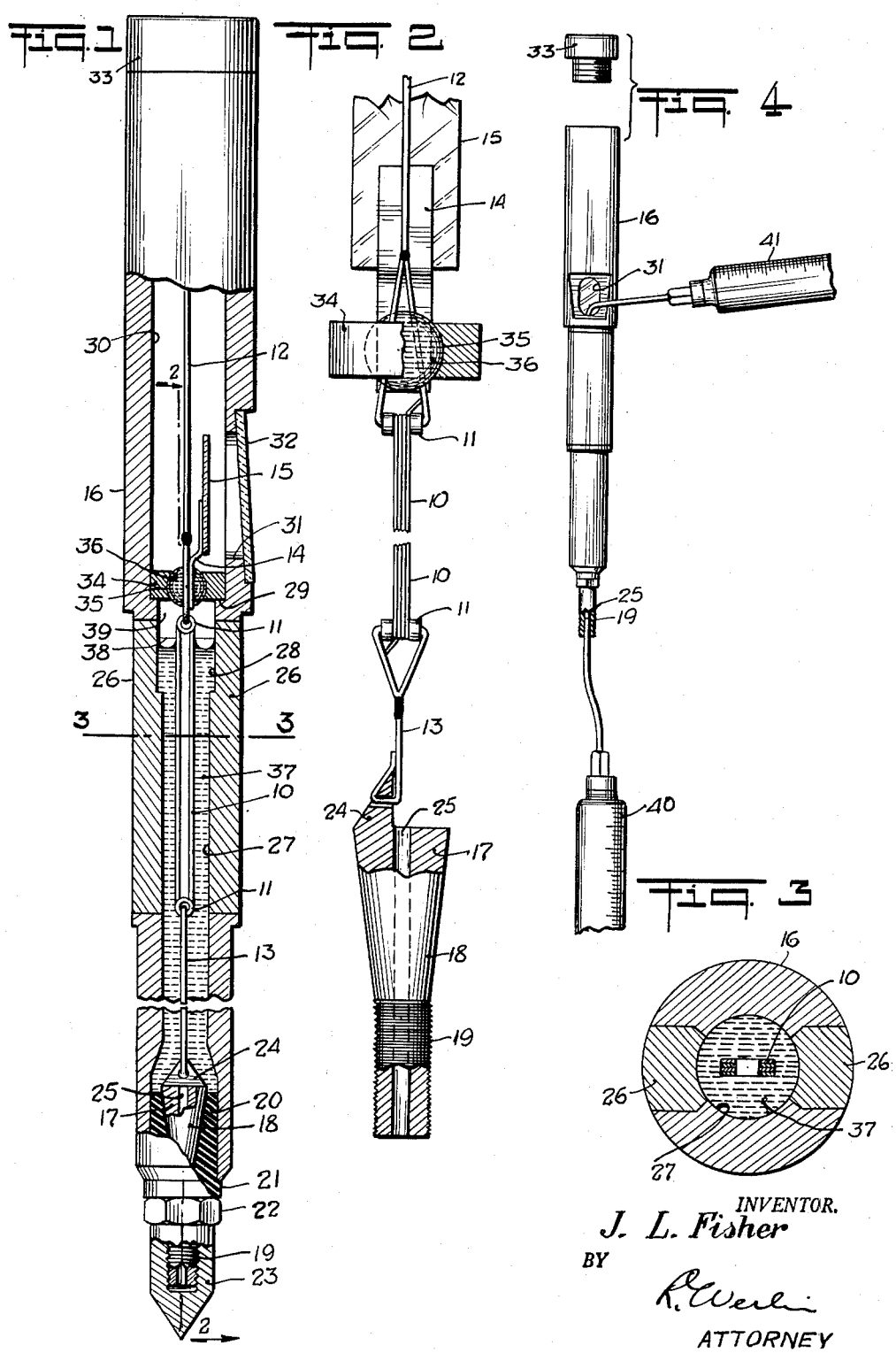
INVENTOR.
J. L. Fisher
BY
ATTORNEY Patented May 6, 1952

2,596,019

UNITED STATES PATENT OFFICE 2,596,019

LIQUID DAMPED GALVANOMETER

James L. Fisher, Tulsa, Okla., assignor to Century Geophysical Corporation, a corporation of Delaware Application December 4, 1948, Serial No. 63,491

10 Claims. (Cl. 171—95)

This invention relates to improvements in galvanometers, particularly galvanometers of the type used in seismograph, oscillograph cameras, and the like.

Such galvanometers normally include a vibratory assembly comprising an elongated coil suspended between a pair of filaments and enclosed within a tubular barrel which is adapted to be vertically inserted between the pole pieces of a magnet between which the galvanometer coil is positioned. Such vibratory assemblies normally are provided with a small mirror mounted on the upper one of the suspension filaments for reflecting a light beam employed to record the oscillations of the coil. Ordinarily, such galvanometers require some means for damping the oscillations, and in conventional practice, the tube or barrel enclosing the galvanometer suspension is normally filled with some suitable damping liquid, generally of an oily character, the entire vibratory assembly, including the mirror, being ordinarily immersed completely in the damping liquid. Such immersion ordinarily produces several difficulties and disadvantages. Due to the presence of the damping liquid between the mirror and the window normally provided in the wall of the enclosing tube for passage of the light beam, the resulting refraction affects focal lengths and causes aberrations of the reflected light waves, frequently resulting in poor definition for recording. If the level of fluid in the tube is originally below the mirror, such fluid will tend to "creep" along the walls of the tube and the suspension filament and will, in time, form a film on the face of the mirror, again disadvantageously affecting its reflections. Also, in creeping or splashing, the active volume of the damping liquid in contact with the vibratory elements will be decreased resulting in a decrease in the damping factor; therefore, again affecting the characteristics of the galvanometer in an undesirable manner.

The principal object of this invention is to provide an improved form of liquid-damped galvanometer which will overcome the above mentioned and other disadvantages of conventional liquid-damped galvanometers.

An important object is to provide a novel form of seal between the damping liquid and the mirror to prevent contact of the damping liquid with the mirror.

Another object is to provide a liquid seal between the damping liquid and the mirror, said liquid seal comprising liquid of a character generally incompatible with the damping liquid.

The structure, in accordance with an illustrative embodiment of this invention, includes the usual tubular barrel having a vibratory assembly of generally conventional form installed therein and containing a column of a suitable and generally conventional damping liquid in which the vibratory assembly is immersed to a level somewhat below the mirror which is mounted on the upper suspension filament above the usual coil member of the vibratory assembly. A novel sealing element is provided in the bore of the barrel intermediate the mirror and the column of damping liquid and spaced therefrom. The sealing element includes a ring having an axial opening through which the upper suspension filament passes, the opening being of generally spherical form adapted to contain a single globule of a suitable sealing liquid which is preferably of a character which is generally incompatible with the damping liquid as will be described in greater detail hereinafter. By virtue of the spherical form of the opening and its dimensions, the globule of sealing liquid will be effectively confined in the opening largely by reason of the natural surface tension of the sealing liquid and by capillary attraction, and will remain in place despite the vibrations of the vibratory assembly and such agitation to which the structure as a whole may be subjected during normal use in the field. An enlargement may be provided in the bore of the barrel immediately below the seal to provide an expansion chamber for the damping liquid which will aid in maintaining separation of the damping liquid from the seal and prevent rupture of the seal. With a structure of the character described, the damping liquid may be effectively confined and kept from contact with the mirror without material alteration of the damping factor. The foregoing and additional objects and advantages of this invention will become apparent from the following detailed description when read in conjunction with the accompanying drawings which illustrate one embodiment in accordance with this invention.

In the drawings:

Fig. 1 is an elevational view, largely in section, of a galvanometer in accordance with the illustrative embodiment;

Fig. 2 is an enlarged elevational view taken generally along line 2—2 of Fig. 1, showing the vibratory assembly and the sealing means removed from the enclosing barrel;

Fig. 3 is a cross-sectional view taken generally along line 3—3 of Fig. 1; and

Fig. 4 is a view illustrating the manner in which the damping and sealing liquids may be introduced into the galvanometer barrel.

Referring to the drawings, the vibratory assembly is of generally conventional construction and comprises a coil 10 wound between a pair of insulating spools 11—11 and mounted between an upper suspension ribbon or filament 12 and a lower suspension ribbon or filament 13, which are electrically connected to the opposite ends of the coil. Rigidly mounted on upper filament 12 immediately above its connection to the upper end of the coil is a longitudinally extending bracket 14 on which is mounted the usual reflecting mirror 15. The vibratory assembly is enclosed within the usual tubular barrel 16 and is anchored to the opposite ends of the barrel by suitable anchoring means, such, for example, as are disclosed in Patent No. 2,439,576, April 13, 1948, to M. E. Morrow. The upper anchor is not shown, as it forms no part of this invention. The lower anchor, which is quite similar to that shown in the aforementioned patent, includes an anchoring stud 17 having a downwardly tapered conical section 18 at its upper end and a threaded shank 19 at its lower end. The stud extends through a tubular insulating bushing 20 provided with a tapered bore complementing the taper of portion 18 and having a flange 21 on its lower end adapted to bear against the lower end of barrel 16 when the bushing is inserted in the end of the barrel. A jam nut 22 is screwed on threaded shank 19 and is adapted, when tightened, to draw stud 17 downwardly into bushing 20 and lock the vibratory assembly to the lower end of the barrel. A terminal cap 23 is adapted to be screwed on the lower end of shank 19. Stud 17 is provided at one side of its upper end with an upstanding ear 24 to which the lower end of filament 13 is attached. A passageway 25 extends axially through stud 17, emerging from the upper end thereof alongside ear 24.

Barrel 16 may be constructed of brass or other non-magnetic material and, in accordance with conventional practice, may have inserted in opposite portions of the wall thereof magnetic pole piece inserts 26 between which coil 10 is suspended for actuation by the magnetic flux passing between these inserts. Barrel 16, including inserts 26, is provided in its lower portion with a bore 27 which in an intermediate portion generally opposite the upper portion of coil 10 is enlarged somewhat to form a section herein termed an expansion chamber 28. At a point slightly above the upper end of coil 10, a further enlargement is made in the bore of the barrel, forming an annular shoulder 29, the portion of the bore above shoulder 29 being designated by the numeral 30. Above shoulder 29 and opposite the position of mirror 15, an opening 31 is provided in the wall of barrel 16 and a glass window 32 is set at an angle in the wall of the barrel to form a transparent closure for opening 31 through which the usual light beam may pass to and from the surface of the mirror. The upper end of the barrel 16 is provided with a screw cap 33 or other suitable form of fluid-tight closure therefor.

A ring 34, constructed of non-magnetic metal or hard plastic, is seated on shoulder 29 and is dimensioned to be inserted through the upper bore 30 and to fit snugly against the wall of the bore when in position on shoulder 29. Ring 34 is provided with an axial opening 35 through which upper filament 12 is threaded. Opening 35 is in the form of a spherical segment having its upper and lower ends cut off at the planes of the upper and lower ends of ring 34. Opening 35 serves as a holder for a single globule of a suitable sealing liquid 36 which surrounds the portion of filament 12 passing through the opening and is adapted to form a liquid seal between the portions of the bore of barrel 16 above and below ring 34. Bore 27 and expansion chamber 28 are filled with a damping liquid 37 to a suitable level in the expansion chamber, as indicated at 38, below ring 34, to thereby provide a space 39 between ring 34 and the upper surface of the column of damping liquid 37. This space will normally be filled with air, which is naturally trapped in this space during assembly of the structure, or other suitable gas may be introduced therein, and will serve as pneumatic cushion for purposes to be described hereinafter.

Damping liquid 37 may be any of the various liquids conventionally used for damping oscillations of vibratory elements of galvanometers. These include various mineral and vegetable base oils, or the newer silicone oils.

Sealing liquid 36 may be generally characterized as a liquid which is incompatible with the damping liquid. That is, it should be generally inert chemically, particularly with respect to the damping liquid and relatively immiscible therewith. It should also have relatively high surface tension properties with respect to its density to assure maintenance of its globular form and retention within spherical opening 35 and should preferably have a high boiling point and low freezing point. Glycerine and various other glycols are some examples of liquids which may be successfully used as sealing liquids.

It will be understood that conventional seismic galvanometers are normally constructed of parts which are of very small dimensions, and the various spaces and passageways between the parts are likewise extremely small and generally of capillary dimensions. For example, in a galvanometer of the type herein illustrated having generally standardized over-all dimensions, the various parts thereof will have dimensions of the following magnitudes:

| | Inches |
|---|---|
| Bore 27 (diameter) | 0.052 |
| Chamber 28 (diameter) | 0.073 |
| Ring 34 (length) | 0.060 |
| Opening 35 (diameter) | 0.038 |

In view of these dimensions, it will be evident that when a quantity of the appropriate sealing liquid sufficient to fill opening 35 is introduced therein, its normal surface tension will naturally cause it to assume the globular form of the opening and adhere strongly to the walls of the opening by virtue solely of capillary attraction. The ends of opening 35, being of smaller diameter than the medial diameter, will effectively confine and retain the globule of sealing liquid within the opening. It is also found that neither the normal oscillations of the suspension filament nor even relatively violent agitation of the galvanometer will dislodge or disrupt the globule and its sealing efficiency will, therefore, be maintained through all conditions of normal usage.

By employing a sealing liquid which is incompatible with the damping liquid, should any of the latter tend to creep along the bore wall and come in contact with the sealing liquid, no mixing or solution of one in the other will occur which might otherwise tend to destroy the homogeneous globular character of the sealing liquid and thereby destroy its sealing efficiency. Because of the relatively small volume of the sealing liquid and the relatively small area of the suspension filament normally in contact therewith, the sealing liquid will not exert any appreciable damping effect on the vibratory assembly, although this may, if found desirable, be taken into account in establishing a suitable damping factor for the galvanometer.

Space 39 is provided to additionally protect the seal formed by sealing liquid 36 against rupture due to expansion and contraction of the column of damping liquid 37 under changes in temperature. The coefficient of expansion of the air or gas in space 39 will ordinarily be about half that of the sealing and damping liquids and is of course quite elastic compared with liquids generally. Accordingly, any changes in the height of the column of damping liquid will be absorbed in the corresponding compression and expansion of the gaseous medium in space 39. Expansion chamber 28 serves as additional protection in this connection in reducing the magnitude of any changes in level of the damping liquid in accordance with well known physical principles.

Fig. 4 illustrates the manner in which the damping and sealing liquids may be introduced into the galvanometer structure after the vibratory assembly has been installed in the barrel and securely anchored to the ends thereof. Before terminal cap 23 is put in place, a conventional hypodermic syringe 40 containing a supply of damping liquid will be connected into passageway 25 and a quantity of the damping liquid to fill the bore of the barrel to the desired height will be injected therein, after which terminal cap 23 is screwed into place. With window 32 removed, a similar hypodermic syringe 41 containing the sealing liquid will be inserted through opening 31 and employed to inject the proper quantity of sealing liquid into opening 35. Thereafter window 32 will be cemented in place and the assembly of the structure will be complete. Screw cap 33 may be put in place before or after the injection of the damping and sealing liquids.

It will be understood that various alterations and changes may be made in the details of the illustrative embodiment without departing from the scope of the appended claims but within the spirit of this invention.

What I claim and desire to secure by Letters Patent is:

1. In a galvanometer of the liquid-damped type including a vibratory element carrying a mirror adjacent its upper end and extending through the bore of a tubular casing, the improvements which comprise, a body of a damping liquid in said bore immersing said element to a level below said mirror, and a liquid seal interposed in said bore between said mirror and said damping liquid.

2. In a galvanometer of the liquid-damped type including a vibratory element carrying a mirror adjacent its upper end and extending through the bore of a tubular casing, the improvements which comprise, a body of a damping liquid in said bore immersing said element to a level below said mirror, a liquid seal interposed in said bore between said mirror and said damping liquid, and an enlargement in said bore below said seal adapted to form an expansion chamber for said damping liquid.

3. In a galvanometer of the liquid-damped type including a vibratory element carrying a mirror adjacent its upper end and extending through the bore of a tubular casing, the improvements which comprise, a body of a damping liquid in said bore immersing said element to a level below said mirror, and a liquid seal interposed in said bore between said mirror and said damping liquid, the liquid comprising said seal being of a character generally incompatible with said damping liquid.

4. In a galvanometer of the liquid-damped type including a vibratory element carrying a mirror adjacent its upper end and extending through the bore of a tubular casing, the improvements which comprise, a body of a damping liquid in said bore immersing said element to a level below said mirror, and a ring member interposed in said bore between said mirror and said damping liquid having an axial opening therethrough of generally spherical form surrounding a portion of the vibratory element, and a sealing liquid filling said opening.

5. In a galvanometer of the liquid-damped type including a vibratory element carrying a mirror adjacent its upper end and extending through the bore of a tubular casing, the improvements which comprise, a body of a damping liquid in said bore immersing said element to a level below said mirror, a ring member interposed in said bore between said mirror and said damping liquid having an axial opening therethrough of generally spherical form surrounding a portion of the vibratory element, a sealing liquid filling said opening, and an expansion chamber containing a pneumatic fluid disposed between said ring and said damping liquid.

6. In a galvanometer of the liquid-damped type including a vibratory element carrying a mirror adjacent its upper end and extending through the bore of a tubular casing, the improvements which comprise, a body of a damping liquid in said bore immersing said element to a level below said mirror, and a ring member interposed in said bore between said mirror and said damping liquid having an axial opening therethrough of generally spherical form surrounding a portion of said vibratory element, and a sealing liquid of a character incompatible with said damping liquid filling said opening.

7. In a galvanometer of the liquid-damped type, a tubular casing, a vibratory element extending through the bore of said casing, said vibratory element including a coil member suspended between a pair of suspension filaments, a mirror mounted on the upper suspension filament spaced from said coil member, a body of damping liquid in said bore immersing said vibratory element to a level below said mirror, and a liquid seal surrounding said upper suspension filament between said mirror and said body of damping liquid.

8. In a galvanometer according to claim 7 wherein said sealing liquid is a material generally incompatible with said damping liquid.

9. In a galvanometer according to claim 7 wherein said sealing liquid is a material of the class consisting of glycerol and glycols and which is further characterized by its incompatibility with said damping liquid.

10. In a galvanometer of the liquid-damped type, a tubular casing, a vibratory element extending through the bore of said casing, said vibratory element including a coil member suspended between a pair of suspension filaments, a mirror mounted on the upper suspension filament spaced from said coil member, a body of a damping liquid in said bore immersing said vibratory element to a level below said mirror, a liquid seal surrounding said upper suspension filament between said mirror and said body of damping liquid, and an expansion chamber containing a pneumatic fluid disposed between said seal and said body of damping liquid.

JAMES L. FISHER.

REFERENCES CITED

The following references are of record in the file of this patent:

UNITED STATES PATENTS

| Number | Name | Date |
| --- | --- | --- |
| 1,051,054 | Anderson | Jan. 21, 1913 |
| 1,701,022 | Thornton | Feb. 5, 1929 |
| 1,951,578 | Peters | Mar. 20, 1934 |
| 2,389,081 | Redmond | Nov. 13, 1945 |
| 2,510,585 | Kellogg | June 6, 1950 |
| 2,519,689 | Morrow | Aug. 22, 1950 |